Figure 1:
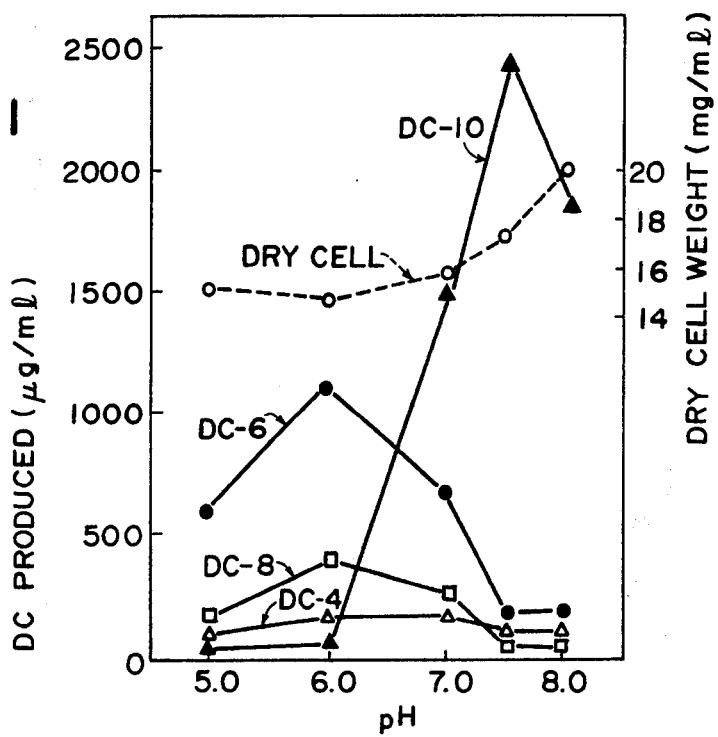

United States Patent [19]

Kaneyuki et al.

[11] 3,912,586

[45] Oct. 14, 1975

[54] METHOD OF PRODUCING DICARBOXYLIC ACIDS BY MICROORGANISMS

[75] Inventors: Hiroo Kaneyuki, Yamaguchi; Koichi Ogata, Osaka, both of Japan

[73] Assignee: Mitsui Petrochemical Industries, Ltd., Tokyo, Japan

[22] Filed: Mar. 28, 1973

[21] Appl. No.: 345,622

[30] Foreign Application Priority Data
June 28, 1972  Japan................................ 47-64061

[52] U.S. Cl..................... 195/28 R; 195/37; 195/82
[51] Int. Cl.².......................................... C12D 1/02
[58] Field of Search................. 195/28 R, 36, 37, 47

[56] References Cited
UNITED STATES PATENTS
3,796,630   3/1974   Wegner............................. 195/28 R FOREIGN PATENTS OR APPLICATIONS
664,587   6/1963   Canada.................................. 195/15

*Primary Examiner*—A. Louis Monacell
*Assistant Examiner*—R. B. Penland
*Attorney, Agent, or Firm*—Ladas, Parry, Von Gehr, Goldsmith & Deschamps

[57] ABSTRACT

The n-paraffin dicarboxylic acids, pimelic acid, adipic acid, and sebacic acid can be produced from n-paraffins with carbon atoms from 9 to 16 by bringing said n-paraffins into contact with a yeast belonging to the species of Torulopsis candida. Particularly, the strain Torulopsis candida NRRL No. Y-7506 is effective for accumulating sebacic acid from n-decane in high yield.

3 Claims, 3 Drawing Figures

METHOD OF PRODUCING DICARBOXYLIC ACIDS BY MICROORGANISMS

This invention relates to a process for producing the dicarbozylic acid pimelic acid, adipic acid and sebacic acid by use of microorganisms. More particularly, the invention pertains to a process for producing said dicarboxylic acids by use of microorganisms, characterized in that yeasts belonging to the species of *Torulopsis candida*, which can produce dicarboxylic acids, are cultured in media containing hydrocarbons, nitrogen sources and the like, or resting cells of said yeasts are brought into contact with hydrocarbons in proper solutions containing carbon sources mainly composed of said hydrocarbons but no nitrogen source, thereby accumulating dicarboxylic acids in said media or solutions.

As to the production of dicarboxylic acids from hydrocarbons by utilization of microorganisms, there have heretofore been known processes using yeasts belonging to the genus *Pichia* or *Candida*. That is, Japanese Pat. Publication No. 24,392/1970 discloses that *Pichia polymorpha* Y-3 is used to produce 45 mg/l of sebacic acid from n-decane, Iizuka et al. have reported that *Candida rugosa* was used to produce 16.7 mg/l of sebacic acid and 0.1 mg/l of suberic acid from n-decane (H. Iizuka, M. Iida and Y. Unami: "J. Gen. Appln. Microbiol.", 12, 119, 1966). Okuhara et al. have reported that *Candida tropicalis* OH-23 was used to produce 1.7 g/l of glutaric acid from n-pentadecane and 0.64 g/l of adipic acid from n-hexadecane (M. Okuhara, Y. Kubochi and T. Harada: "Agr. Biol. Chem.," 35, 1376, 1971). Quite recently, Shiio et al. have made such report that when n-alkanes having 9 to 14 carbon atoms were used as carbon sources, *Candida cloacae* could produce corresponding dicarboxylic acids having the same carbon atoms as above, respectively (I. Shiio and R. Uchio: "Agr. Biol. Chem.," 35, 2033, 1971). This report describes that 2.28 g/l of dodecane dicarboxylic acid, 0.82 g/l of suberic acid and 1.86 g/l of adipic acid were produced under optimum conditions from n-dodecane, which gave largest amounts of dicarboxylic acids. It has also been reported that dicarboxylic acid was detected as the component of glycolipids accumulated in culture broth of a yeast belonging to the species of *Torulopsis gropengieeseri* (Jones, D. F., Howe, R.: J. Chem. Soc. (C), 2801, 1968). However, there have been no report of the direct accumulation of dicarboxylic acid by the use of a yeast belonging to the genus *Torulopsis*.

An object of the present invention is to provide a process for producing dicarboxylic acids namely pimelic acid, adipic acid and sebacic acid from hydrocarbons using microorganisms which process has been greatly improved in yield and selectivity.

With an aim to accomplish the above-mentioned object, the present inventors examined what species of microorganisms could effectively utilize hydrocarbons to produce said dicarboxylic acids, and conducted screen tests about various strains. At the result, the inventors have newly found that a strain belonging to the species of *Torulopsis candida* can produce said dicarboxylic acids from hydrocarbons. The inventors have further found that other known strains belonging to the species of *Torulopsis candida* can also produce dicarboxylic acid from hydrocarbons.

The results of taxonomic studies on the above-mentioned strains (*Torulopsis candida* NRRL No. Y-7506), which has newly been isolated by the inventors from sewage in Kyoto City, Japan, are as follows:

Diagnostic tests of the strain were carried out according to the methods of Lodder (The Yeasts, A Taxonomic Study, 2nd Ed., North Holland Pub. Co., Amsterdam, London, 1970) and of Iizuka and Goto (Kobo no Bunrui-dotei ho - Methods of classification and identification of yeasts-University of Tokyo Press, Japan, 1969).

a. Growth on various culture medium:
  i. Liquid medium: YM (yeast extract, malt extract) liquid media (cultured at 28°C. for 3 days):
    Ellipsoidal to cylindrical, 2.5 to 5.6 by 3.8 to 10.0 microns. Ring was formed with granular sediments.
  ii. Slant agar medium: YM agar medium (cultured at 28°C. for 3 days):
    Ellipsoidal, 2.5 to 5.0 by 5.0 to 8.0 microns. Good growth, colony cream-colored, buttery, surface smooth dull and raised. The margin was undulate to entire.
  iii. Slide culture: No pseudomycelium was formed on corn.meal-, Morton-, Seeliger- and Nickerson.-Mankowski-agars. On Potato.glucose-agar and Taschdjian-agar, very rudimentary pseudomycelia were formed after 15 to 20 days at 28°C.
b. Formation of ascospores:
  The strain was cultured on gypsum, Gorodokowa, modified Gorodokowa, glucose-peptone, Fowell, nitrogen-free, and V-8 media, but no formation of ascospores was observed on any sporulating media tested.
c. Physiological characteristics:
  i. Optimum growth conditions: Optimum pH: 4 to 8.5 Optimum growth temperature: 25° to 35°C.
  ii. Growth ranges: pH: 2 to 9.5 Temperature: 10° to 40°C. (Death temperature: The strain died when allowed to stand at 60°C. for 30 minutes)
  iii. Assimilation of Nitrates: Negative
  iv. Splitting of fat: Negative
  v. Urease: Negative
  vi. Gelatin liquefaction: Negative
  vii. Osmotic pressure resistance: No growth on 50 percent glucose-agar medium.
  viii. Formation of carotenoids: Negative
  ix. Formation of starch-like compounds: Negative
  x. Vitamin-requiring property: Absolutely biotin-requiring.
  xi. Splitting of arbutin: Positive
  xii. Litmus milk medium:
    No film formation, no peptonization, no coagulation, color tone changes to bluish purple.
  xiii. Formation of ester: Positive
d. Fermentation and assimilation of various carbon sources:
  i. Fermentation test according to Durham's fermentation tube method.

| | | |
|---|---|---|
| Glucose | + | |
| Galactose | + | S,W |
| Sucrose | + | S,W |
| Maltose | + | S,W |
| Lactose | + | S,W |
| Raffinose | + | W |
| Melibiose | + | |
| Xylose | + | S,W |
| Trehalose | +S | |
| Arabinose | − | |

| α-Methyl- | | |
| --- | --- | --- |
| glucoside | + | S |
| Inulin | − | |
| Dextrin | − | |

S: Slow
W: Weak (ii) Assimilation of carbon compounds:

| | | | |
| --- | --- | --- | --- |
| Glucose | + | L-Rhamnose | − |
| Galactose | + | Ethanol | + |
| L-Sorbose | + | Glycerol | + |
| Meltose | + | Erythritol | − |
| Sucrose | + | Adonitol | + |
| Cellobiose | + | Dulcitol | − |
| Trehalose | + | D-Mannitol | + |
| Lactose | + | D-Sorbitol | + |
| Melibiose | + | α-Methyl-glucoside | + |
| Raffinose | + | Salicin | + |
| Melezitose | + | Na-D-gluconate | − |
| Inulin | + S,W | Ca-2-keto-D-gluconate | + |
| Soluble starch | − | DL-Lactate | + |
| D-Xylose | + | Succinate | + |
| D-Arabinose | − | Citrate | + |
| L-Arabinose | + | Inositol | − |
| D-Ribose | − | | |

S: Slow
W: Weak

As is clear from the above-mentioned morphological and physiological characteristics, the strain newly isolated is a yeast which does not form ascospores, carotenoid dyes and arthrospores, proliferates by germination, forms no pseudomycelia (very few rudimentary pseudomycelia are formed after a long period of incubation on a potatoglucose medium), and does not form starch-like compounds. According to the classification of J. Lodder & N. J. W. Kergervan Rij: "The Yeasts, A Taxonomic Study," therefore, the strain belongs to the species of *Torulopsis candida*. Therefore, the strain was deposited with Northern Utilization Research and Development Division, U.S. Department of Agriculture, Peoria, Illinois (Deposit number: NRRL No. Y-7506).

Microorganisms usable in the present invention include not only the above-mentioned *Torulopsis candida* NRRL No. Y-7506 and mutants thereof but also all yeasts belonging to the species of *Torulopsis candida*, so far as they can utilize hydrocarbons to produce dicarboxylic acids.

In practicing the present invention, it is necessary to bring the above-mentioned yeasts belonging to the species of *Torulopsis candida* into contact with hydrocarbons. The hydrocarbons used in the present invention are ordinarily n-paraffins. However, hydrocarbons other than n-paraffins may, of course, be used. The n-paraffins are preferably those which have 9 to 16 carbon atoms. The use of n-decane is particularly advantageous. The n-paraffins may be used either singly or in the form of a mixture. Alternatively, n-paraffin-containing hydrocarbons (e.g. kerosene, light oils, etc.) may also be used.

According to a preferred embodiment of the present invention, a yeast belonging to the species of *Torulopsis candida*, e.g. *Torulopsis candida* NRRL No. Y-7506, is inoculated and cultured in a medium containing a hydrocarbon, a nitrogen source, and other necessary nutriment sources, whereby dicarboxylic acids, identical in number of carbon atoms with, or less in number of carbon atoms than the starting hydrocarbon, are obtained. The present inventors have confirmed that n-decane gives sebacic acid with smaller amounts of succinic acid and adipic acid, and n-paraffins having 9 to 16 carbon atoms give corresponding dicarboxylic acids identical in number of carbon atoms with, or less in number of carbon atoms than, the said n-paraffins.

Using n-paraffins having 9 to 16 carbon atoms, the abovementioned strain was cultured to obtain such results as set forth in Table 1.

TABLE I

Dicarboxylic acid (DC) formation from n-paraffins by use of the yeast, Torulopsis candida NRRL No. Y-7506

| n-paraffins CN* 5%(v/v) | DC-N**-produced (μg/ml) | | | | | | | | | | | | |
| --- | --- | --- | --- | --- | --- | --- | --- | --- | --- | --- | --- | --- | --- |
| | DC-4 | DC-5 | DC-6 | DC-7 | DC-8 | DC-9 | DC-10 | DC-11 | DC-12 | DC-13 | DC-14 | DC-15 | DC-16 |
| $C_9$ | | | | 18 | | 375 | | | | | | | |
| $C_{10}$ | 176 | | 375 | | 75 | | 5820 | | | | | | |
| $C_{11}$ | | 189 | | 2110 | | 23 | | 188 | | | | | |
| $C_{12}$ | | | 1105 | | 289 | | | | 20 | | | | |
| $C_{13}$ | | 37 | | 823 | | 16 | | 3 | | 1 | | | |
| $C_{14}$ | | | 254 | | 74 | | 15 | | 5 | | 1 | | |
| $C_{15}$ | | 18 | | 278 | | 20 | | 3 | | | | 1 | |
| $C_{16}$ | | | 785 | | 11 | | 14 | | | | | | 10 |

Conditions: Cultivation was carried out at 28°C. for 5 days.
Medium: A mixture comprising 0.2 g. of $K_2HPO_4$, 0.1 g. of $KH_2PO_4$, 0.1 g. of Difco yeast extract, 0.05g. of $MgSO_4.7H_2O$ and 3.2 g. of corn steep liquor was dissolved in 100 ml. of tap water. Subsequently, 63 ml. of the resulting solution was taken up, sterilized and then incorporated with 3.5 ml. of a separately sterilized n-decane. The pH of the medium was adjusted to 7.5. Into the thus prepared medium was inoculated 3.5 ml. of a seed culture.
*CN denotes n-paraffin with N carbon atoms.
**DC-N denotes dicarboxylic acid with N carbon atoms.

As is clear from Table 1, the $C_9$ to $C_{16}$ n-paraffins give dicarboxylic acids identical in number of carbon atoms with said n-paraffins, but dicarboxylic acids other than sebacic acid are slight in amount. n-Paraffins having an even number of carbon atoms give dicarboxylic acids having an even number of carbon atoms, while n-paraffins having an odd number of carbon atoms give dicarboxylic acids having an odd number of carbon atoms. Further, in the case where n-paraffins other than n-decane are used, there is such a tendency that adipic acid is accumulated when said n-paraffins have an even number of carbon atoms, while pimelic acid is accumulated when said n-paraffins have an odd number of carbon atoms.

The medium used in the present invention for the cultivation of a yeast belonging to the species of *Toru-* lopsis candida is composed of about 1 to 10 percent of a hydrocarbon, a nitrogen source, inorganic salts and, if necessary, other nutriment sources. Examples of the nitrogen sources include inorganic nitrogen sources such as ammonium nitrate, ammonium sulfate, ammonium chloride and ammonium phosphate, and organic nitrogen sources such as peptone, Casamino acids, urea and corn steep liquor. Examples of the inorganic salts include potassium phosphate, sodium phosphate, magnesium sulfate, manganese sulfate, iron sulfate, zinc sulfate and calcium chloride. The nutriment sources, which are used as occasion demands, are suitably selected from yeast extracts, corn steep liquor, meat extracts and vitamins.

A preferable medium is composed of 10 to 100 g. of n-paraffin, 1 to 40 g. of a nitrogen compound (e.g. ammonium sulfate, corn steep liquor), 0.2 to 3 g. of monopotassium hydrogenphosphate, 0.2 to 3 g. of dipotassium hydrogenphosphate, 0.1 to 1 g. of magnesium sulfate heptahydrate, each 0.1 to 20 mg. of at least one member selected from iron sulfate heptahydrate, zinc sulfate heptahydrate, manganese sulfate tetrahydrate, calcium chloride, sodium chloride and copper sulfate, and 100 to 1,500 mg. of yeast extract or corn steep liquor, which have been dissolved in 1 liter of distilled water, city water or well water.

A medium of such a composition as mentioned above is sterilized at 120°C. for 5 to 15 minutes, and then a dicarboxylic acid-producing yeast belonging to the species of Torulopsis candida, e.g. Torulopsis candida NRRL No. Y-7506, is inoculated into the medium. The pH at the time of cultivation is preferably from 2 to 9, more preferably from 5 to 8. The cultivation is carried out under aerobic conditions according to shaking culture or aerobic stirring culture at a temperature of 20° to 35°C., preferably 20° to 30°C.

Results of experiment carried out by use of $(NH_4)_2SO_4$ as a nitrogen source are shown in Table 2. The formation amount of sebacic acid was maximum when the concentration of $(NH_4)_2SO_4$ was 0.2 percent, and considerably decreased with increasing concentration thereof. In contrast thereto, the formation amount of adipic acid tended to increase with increasing concentration of $(NH_4)_2SO_4$.

TABLE 2

Effect of nitrogen source on dicarboxylic acid formation from n-decane:

Medium: 63 ml. medium A*, 3.5 ml. n-decane and 3.5 ml. seed culture, total 70 ml., pH was adjusted to 7.5 with 2N-NaOH twice a day.

Cultivation was carried out at 28°C.

| $(NH_4)_2SO_4$ (%) | n-Decane (%) | C/N ratio | Cultural period (day) | DC-10 | DC-8 | DC-6 | DC-4 | Cell (mg/ml) |
|---|---|---|---|---|---|---|---|---|
| 0.2 | 5 | 25 | 4 | 2392 | — | 366 | 25 | 15.3 |
|  |  |  | 5 | 2862 | — | 390 | 29 | 11.1 |
|  |  |  | 6 | 3100 | — | 427 | 29 | 10.5 |
| 0.4 | 5 | 12.5 | 4 | 997 | 31 | 753 | 33 | 13.1 |
|  |  |  | 5 | 1133 | 36 | 780 | 41 | 12.7 |
|  |  |  | 6 | 1070 | 36 | 771 | 49 | 10.9 |
| 0.8 | 5 | 6.2 | 4 | 1442 | 37 | 903 | 125 | 13.1 |
|  |  |  | 5 | 1318 | 51 | 1046 | 66 | 11.8 |
|  |  |  | 6 | 1350 | 72 | 1120 | 39 | 10.5 |

* Composition of medium A: 0.2 to 0.8 gram of $(NH_4)_2SO_4$ (variable), 0.2 g. of $A_2HPO_4$, 0.1 g. of $KH_2PO_4$, 0.1 g. of Difco yeast extract and 0.05 g. of $MgSO_4 \cdot 7H_2O$ were dissolved in 100 ml. of tap water, and the resulting solution was adjusted to a pH of 7.0.

Results of experiment carried out by use of $NH_4H_2PO_4$ as a nitrogen source are shown in Table 3. The formation amount of sebacic acid was maximum when the concentration of $NH_4H_2PO_4$ was 0.4 percent. Although the amount of said acid tended to decrease at concentration above 0.4 percent, the extent of decrease was not so marked as in the case of $(NH_4)_2SO_4$.

TABLE 3

Effect of nitrogen source on dicarboxylic acid formation from n-decane:

Medium: Medium A containing $NH_4H_2PO_4$ instead of $(NH_4)_2SO_4$.

Other conditions were the same as indicated in Table 2.

| $NH_4H_2PO_4$ (%) | n-Decane (%) | C/N ratio | Cultural period (day) | DC-10 | DC-8 | DC-6 | DC-4 | Cell (mg/ml) |
|---|---|---|---|---|---|---|---|---|
| 0.4 | 5 | 12.5 | 4 | 2840 | — | 98 | 27 | 13.6 |
|  |  |  | 5 | 3440 | — | 122 | 33 | 12.8 |
|  |  |  | 6 | 3340 | — | 116 | 53 | 9.9 |
| 0.8 | 5 | 6.2 | 4 | 2200 | — | 235 | 103 | 14.9 |
|  |  |  | 5 | 2430 | — | 265 | 29 | 12.0 |
|  |  |  | 6 | 2460 | — | 326 | 29 | 11.3 |
| 1.6 | 5 | 3.1 | 4 | 2200 | — | 220 | 88 | 14.5 |
|  |  |  | 5 | 2430 | 10 | 375 | 74 | 16.5 |
|  |  |  | 6 | 2320 | 10 | 493 | 29 | 14.6 |

In case urea was used as an organic nitrogen source, the formation amount of sebacic acid was maximum when the concentration of urea was 0.1 percent, as shown in Table 4.

TABLE 4

Effect of nitrogen source on dicarboxylic acid formation from n-decane:

Medium: Medium A containing urea instead of $(NH_4)_2SO_4$.

Other conditions were the same as indicated in Table 2.

| Urea (%) | n-Decane (%) | C/N ratio | Cultural period (day) | DC produced (μg/ml) DC-10 | DC-8 | DC-6 | DC-4 | Cell (mg/ml) |
|---|---|---|---|---|---|---|---|---|
| 0.1 | 5 | 50 | 4 | 3082 | — | 78 | 18 | 17.3 |
|  |  |  | 5 | 3646 | — | 110 | 23 | 14.0 |
|  |  |  | 6 | 3760 | — | 158 | 33 | 12.8 |
| 0.2 | 5 | 25 | 4 | 2184 | — | 249 | 23 | 18.1 |
|  |  |  | 5 | 2140 | — | 249 | 54 | 16.4 |
|  |  |  | 6 | 1984 | — | 308 | 60 | 13.9 |
| 0.4 | 5 | 12.5 | 4 | 1260 | — | 192 | 16 | 19.7 |
|  |  |  | 5 | 1138 | — | 218 | 19 | 21.3 |
|  |  |  | 6 | 1158 | — | 249 | 26 | 19.5 |

As is clear from the above, the formation amounts of sebacic acid were maximum when the concentrations of $(NH_4)_2SO_4$, $NH_4H_2PO_4$ and urea were 0.2 percent, 0.4 percent and 0.1 percent, respectively. These values were substantially identical with each other in view of the absolute amount of nitrogen.

In case corn steep liquor was used as a nitrogen source, the formation amount of sebacic acid was maximum when the concentration of corn steep liquor was 3.2 percent, as shown in Table 5. In case the concentration of n-decane was 10 percent, the formation amounts of dicarboxylic acids were substantially identical with each other when the C/N ratios were in the range from 12.5 to 3.1.

TABLE 5

Effect of nitrogen source on dicarboxylic acid formation from n-decane;
Medium: Medium A containing corn steep liquor instead of $(NH_4)_2SO_4$.
Other conditions were the same as indicated in Table 2.

| CSL (%) | n-Decane (%) | C/N ratio | Cultyral period (day) | DC produced (μg.ml) C-10 | DC-8 | DC-6 | DC-4 | Cell (mg/ml) |
|---|---|---|---|---|---|---|---|---|
| 0.4 | 5 | 12.5 | 5 | 2258 | — | 19 | 46 | 11.4 |
|  |  |  | 6 | 2426 | — | 31 | 50 | 10.0 |
| 0.8 | 5 | 6.2 | 4 | 2980 | — | 54 | 24 | 14.8 |
|  |  |  | 5 | 3320 | — | 56 | 52 | 14.1 |
|  |  |  | 6 | 3695 | — | 100 | 18 | 12.5 |
| 1.6 | 5 | 3.1 | 4 | 2540 | — | 106 | 25 | 19.9 |
|  |  |  | 5 | 2788 | — | 289 | 28 | 18.2 |
|  |  |  | 6 | 2650 | — | 222 | 24 | 18.2 |
| 3.2 | 5 | 1.6 | 4 | 4080 | 125 | 196 | 24 | 21.1 |
|  |  |  | 5 | 4410 | 157 | 485 | 21 | 18.3 |
|  |  |  | 6 | 4730 | 175 | 544 | — | 14.3 |
| 0.8 | 10 | 12.5 | 5 | 4025 | — | 59 | 25 | 12.9 |
|  |  |  | 7 | 4550 | — | 58 | 46 | 13.1 |
|  |  |  | 8 | 6360 | — | 62 | 357 | 14.7 |
| 1.6 | 10 | 6.2 | 5 | 4000 | 13 | 125 | 25 | 22.7 |
|  |  |  | 7 | 4720 | 14 | 112 | 42 | 25.2 |
|  |  |  | 8 | 5160 | 23 | 129 | 77 | 24.4 |
| 3.2 | 10 | 3.1 | 5 | 4570 | 141 | 153 | 14 | 22.7 |
|  |  |  | 7 | 5760 | 196 | 224 | 31 | 25.0 |
|  |  |  | 8 | 6240 | 199 | 249 | 38 | 28.5 |

According to another preferred embodiment of the present invention, cells of a yeast belonging to the species Torulopsis candida which has previously been cultured in a proper medium, are collected by centrifuge or the like means, the collected cell is dispersed in a suitable solvent, e.g. phosphate buffer or the like, which contains a hydrocarbon but no nitrogen source, and the resulting suspension is stirred or shaken to contact and react the cell with the hydrocarbon (this method will be referred to as "resting cell method," hereinafter), whereby a dicarboxylic acid having carbon atoms equal to or fewer than the carbon atoms of the hydrocarbon can be obtained.

A preferable medium for the resting cell is prepared by dissolving 3 to 5 g. of monoammonium hydrogenphosphate, 1 to 3 g. of dipotassium hydrogenphosphate, 0.5 to 2 g. of monopotassium hydrogenphosphate, 0.2 to 1 g. of magnesium sulfate heptahydrate, 0.1 to 2 g. of yeast extract, and as a carbon source 20 to 60 g. of at least one member selected from various saccharides, sugaralcohols, organic acids such as citric acid, alcohols such as ethanol, and hydrocarbons such as n-decane, in 1 liter of water (distilled water or city water), and adjusting the resulting solution to pH of 6.5 to 7.5. The effect of the thus prepared medium varies depending on the kind of carbon source, and the use of xylose, sorbitol or citric acid, for example, gives favorable results.

The reaction solution used for contacting and reacting resting cells with a hydrocarbon is prepared, for example, by adjusting to a pH of 5 to 9 a 0.5M-phosphate buffer solution or a solution formed by removing the nitrogen and carbon sources from the aforesaid medium. To this solution are added pre-cultured, separated and washed cells and a suitable hydrocarbon, and the solution is stirred or shaken under aerobic conditions at 20° to 35°C., preferably 20° to 30°C. whereby dicarboxylic acids are formed.

In order to recover dicarboxylic acids accumulated in the culture or solution used in any of the aforesaid two methods, the culture or solution is subjected to ordinary acid extraction. For example, the culture is freed by centrifuge from the cells and then acidified with hydrochloric acid, the dicarboxylic acids are extracted with ether or the like, and the solvent is removed by distillation, whereby crude crystals of the dicarboxylic acids can be obtained. The crude crystals may be purified by recrystallization from a suitable solvent such as water, chloroform or hexane which is to be selected according to the kind of desired dicarboxylic acids.

Referring now to the annexed drawings, FIG. 1 shows effect of pH on DC (dicarboxylic acid) accumulation by Torulopsis candida NRRL No. Y-7506. The composition of the medium was as follows: 5.0 ml n-$C_{10}$, 0.2 g $(NH_4)_2SO_4$, 0.2 g $K_2HPO_4$, 0.1 g $KH_2PO_4$, 0.05 g $MgSO_4.7H_2O$, and 0.1 g yeast extract in 100 ml of tap water. Seventy milliliters of this medium was placed in a 500 ml-shake flask. The cultivation was carried out at 28°C for 7 days. In the course of cultivation, the pH was adjusted with 2N NaOH twice a day.

Figure 2:
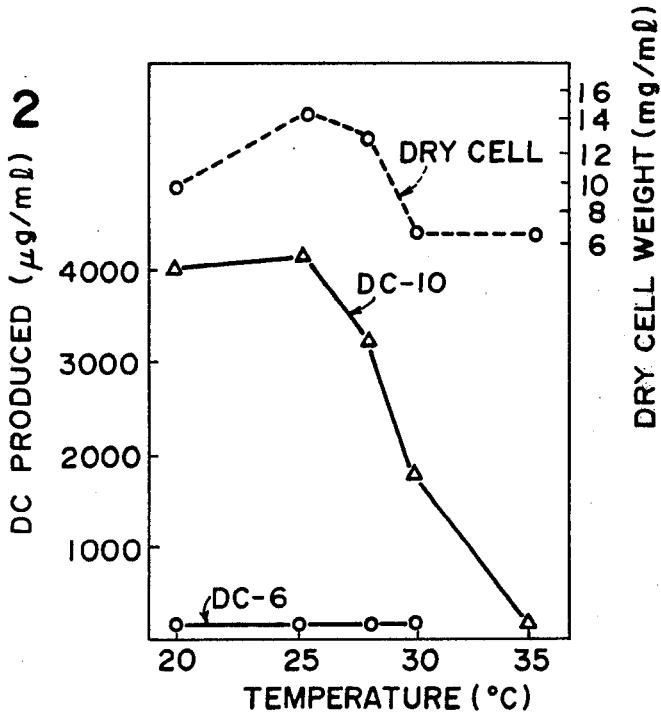

FIG. 2 shows effect of temperature on DC accumulation by Torulopsis candida NRRL No. Y-7506. The cultivation was carried out at various temperatures for 5 days. The other conditions were the same as described in FIG. 1. The pH of the culture broth was maintained at 7.5.

Figure 3:
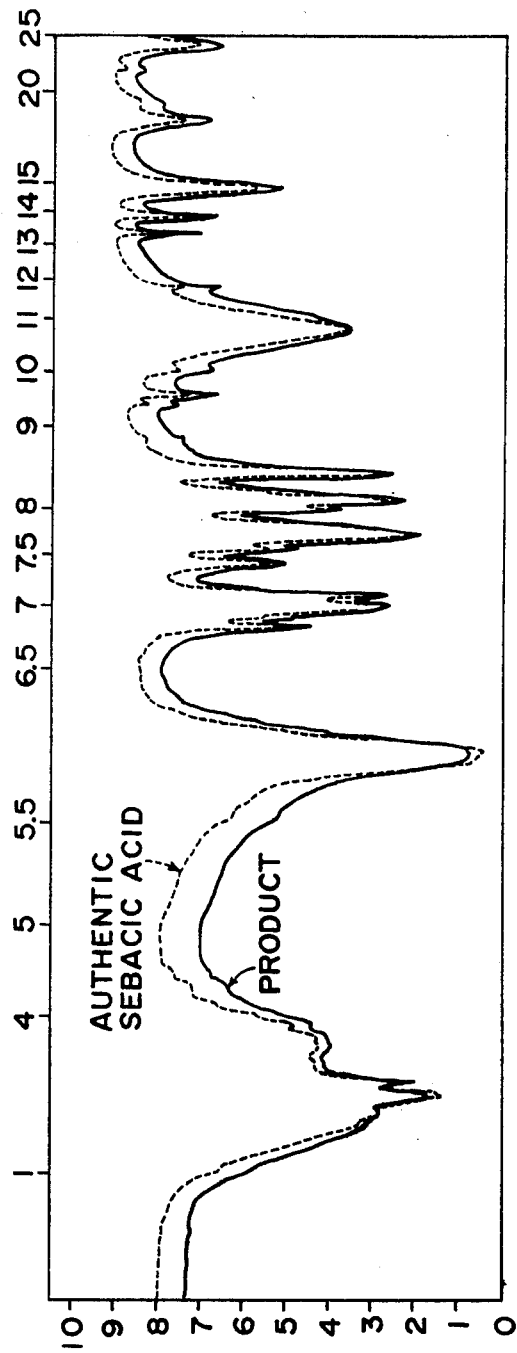

FIG. 3 shows the IR spectra of the acid obtained according to the procedure as described in Example 1 and the authentic sebacic acid.

From the results shown in FIG. 1, it is understood that the optimum pH for sebacic acid formation under the conditions as described above is about 7.5, and the formation amount quickly decreases if the pH is lower or higher than 7.5, and that in case the pH is 7.5, the formation amounts of acids having 8 or less carbon atoms are small, and sebacic acid is mainly formed.

The optimum cultivation temperature for sebacic acid formation from n-decane under the conditions as described above is in the range from 20° to 25°C. as shown in FIG. 2, and it has been found that if the temperature is higher than said range, the formation amount of sebacic acid quickly decreases.

The present invention is illustrated in detail below with reference to examples.

EXAMPLE 1

A mixture comprising 4 g. of ammonium sulfate, 2 g. of dipotassium hydrogenphosphate, 1 g. of monopotassium hydrogenphosphate, 0.5 g. of magnesium sulfate heptahydrate and 1 g. of yeast extract was dissolved in 1 liter of city water, and the resulting solution was adjusted to a pH of 7.5 to prepare a culture liquor. Subsequently, 63 ml. of the culture liquor was poured into a shaking flask of 500 ml. in volume, sterilized at 120°C. for 15 minutes, and then incorporated with 3.5 ml. of separately sterilized n-decane. Into the thus prepared culture liquor was inoculated 3.5 ml. of a suspension of *Torulopsis candida* NRRL No. Y-7506 which had been cultured in a culture liquor of the same composition as above. The shaking culture was carried out at 28°C. for 5 days, while adjusting the pH thereof to 7.5 with an aqueous alkali solution twice a day. The shaking was a reciprocal shaking conducted under such conditions as a shaking width of 5 cm. and a reciprocation of 120 times per minute.

Thereafter, 500 ml. of the culture was freed from the cells by centrifuge, and then the liquid phase portion was concentrated to 200 ml. and acidified by addition of hydrochloric acid to deposit crystals. The crystals were extracted 3 times with ether, and the ether extracts were combined together, washed with water and then dehydrated over anhydrous sodium sulfate. Subsequently, the ether was removed by distillation to form crude crystals, which were then recrystallized from water to obtain 0.57 g of a white leaflets having a melting point of 134° to 135°C. The thus obtained substance showed no melting point depression even when mixed and melted together with an authentic sebacic acid. Further, the results of IR analysis (FIG. 3) and elementary analysis of said substance were identical with those of an authentic sebacic acid.

ELEMENTARY ANALYSIS:

| (for $C_{10}H_{18}O_4$) | C | H |
|---|---|---|
| Calculated (%) | 59.38 | 8.97 |
| Found (%) | 59.46 | 9.12 |

EXAMPLE 2

Seed culture of *Torulopsis candida* NRRL No. Y-7506 was inoculated into the same medium as in Example 1, and subjected at 28°C. for 6 days to shaking culture in the same manner as in Example 1. During this period, the pH of the medium was adjusted to 5.5 every 24 hours with an aqueous alkali solution.

After neutralization, 500 ml. of the culture was freed from the cells by centrifuge, acidified with hydrochloric acid, and then extracted with ether. Subsequently, the acid was transferred from the ether phase to aqueous alkali solution, and the aqueous phase was acidified with sulfuric acid and again extracted with ether. The ether extract was washed with water and then dehydrated over anhydrous sodium sulfate. Thereafter, the ether was vaporized to obtain 1.05 g. of a crude crystalline substance. This crude crystalline substance was methylated and subjected to gas chromatography, whereby the retention time of said substance coincided with that of an authentic dimethyl adipate. Accordingly, it was identified that the said substance was adipic acid. Further, it was found according to gas chromatograph that the purity of said substance was 87 percent.

EXAMPLE 3

A mixture comprising 4 g. of monoammonium hydrogenphosphate, 2 g. of dipotassium hydrogenphosphate, 1 g. of monopotassium hydrogenphosphate, 0.5 g. of magnesium sulfate heptahydrate, 1 g. of yeast extract and 50 g. of citric acid was dissolved in 1 liter of city water, and the resulting solution was adjusted to a pH of 7.5 to prepare a culture liquor. Subsequently, 50 ml. of the culture liquor was poured into a shaking flask of 500 ml. in volume, and then sterilized at 120°C. for 15 minutes. Thereafter, *Torulopsis candida* NRRL No. Y-7506 was inoculated into the culture liquor, and precultured at 28°C. for 3 days, while adjusting the pH to 6.

Separately, 70 ml. of a 0.5M-phosphate buffer solution at pH 7.5 was poured into a shaking flask of 500 ml. in volume. Into this solution were suspended resting cells, which had been separated from the aforesaid culture liquor and washed, and the resulting suspension was incorporated with 2 ml. of n-decane, and then subjected to shaking at 28°C. for 91 hours. The shaking conditions were the same as in Example 1.

After completion of the reaction, the reaction liquid (pH 7.5) was centrifuged to remove the cells, acidified and then extracted with ether. The ether extract was dried over anhydrous sodium hydroxide, and then the ether was removed by distillation to obtain 0.55 g. of a crude crystalline substance from 500 ml. of the reaction liquid. The crude crystalline substance was methylated and subjected to gas chromatography, whereby the retention time of said substance was identical with that of an authentic dimethyl sebacate. Accordingly, it was identified that the said substance was sebacic acid. Further, it was found according to gas chromatography that the purity of said substance was 95 percent.

EXAMPLE 4

A mixture comprising 32 g. of corn steep liquor, 2 g. of dipotassium hydrogenphosphate, 1 g. of monopotassium hydrogenphosphate, 0.5 g. of magnesium sulfate heptahydrate and 1 g. of yeast extract was dissolved in 1 liter of city water, and the resulting solution was adjusted to a pH of 7.5 to prepare a culture liquor. Subsequently, 63 ml. of the culture liquor was poured into a shaking flask of 500 ml. in volume, sterilized at 120°C. for 10 minutes, and then incorporated with 3.5 ml. of separately sterilized n-decane. Into the thus prepared culture liquor was inoculated 3.5 ml. of a seed culture of *Torulopsis candida* NRRL No. Y-7506 which had been cultured in a culture liquor of the same composition as above, and the suspension was subjected to shaking culture at 28°C. for 5 days, while adjusting the pH to 7.5 with an aqueous sodium hydroxide solution twice a day. The shaking was a reciprocal shaking conducted under such conditions as a shaking width of 7 cm. and a reciprocation of 120 times per minute.

After completion of the cultivation, the product was methylated and analyzed according to gas chromatography to find that 7.4 g/l of sebacic acid had been produced. The product was treated in the same manner as in Example 1 to obtain 6.0 g. of sebacic acid from 1 liter of the culture.

EXAMPLE 5

Example 4 was repeated, but *Torulopsis candida* IFO 0380 (deposited at Institution for Fermentation, Osaka, Japan) was used in place of *Torulopsis candida* NRRL No. Y-7506. In the resulting culture broth were accumulated 35.6 mg/l of adipic acid and 4.1 mg/l of sebacic acid.

EXAMPLE 6

Example 4 was repeated, but *Torulopsis candida* IFO 0405 was used in place of *Torulopsis candida* NRRL No. Y-7506, with the result that 407 mg/l of adipic acid was accumulated in the culture broth.

What we claim is:

1. A method for preparing the n-paraffin dicarboxylic acids - pimelic acid, adipic acid and sebacic acid, which comprises culturing the yeast strain *Torulopsis candida* NRRL NO. Y-7506 in a medium containing as essential components carbon sources and nitrogen sources, said carbon sources being mainly composed of at least one n-paraffin with 9 to 16 carbon atoms, at a temperature of 20° to 35°C and at a pH of 2 to 9, to accumulate said n-paraffin dicarboxylic acids.

2. A method according to claim 1 in which said yeast strain is used in a resting cell condition.

3. A method according to claim 1 in which the n-paraffin carbon source is n-decane.

* * * * *